Nov. 25, 1947.  J. E. JOHANSSON  2,431,563
TWO CYCLE ENGINE WITH SUPERCHARGER DRIVEN BY PARALLEL
HIGH AND LOW PRESSURE STAGED EXHAUST GAS TURBINE
Filed Nov. 17, 1943   2 Sheets-Sheet 1
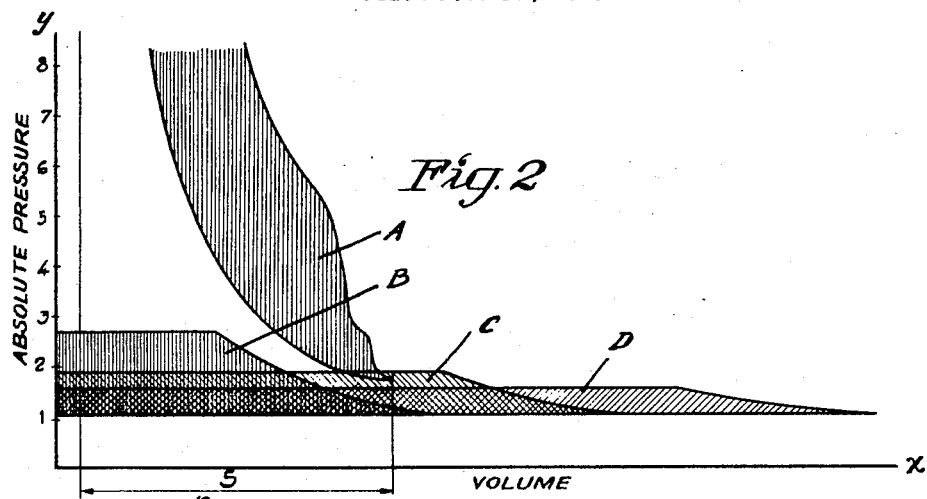
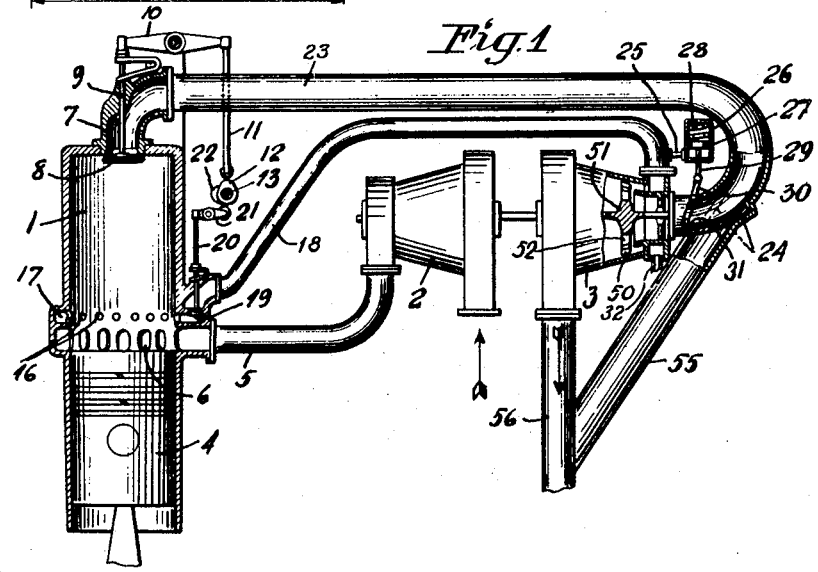

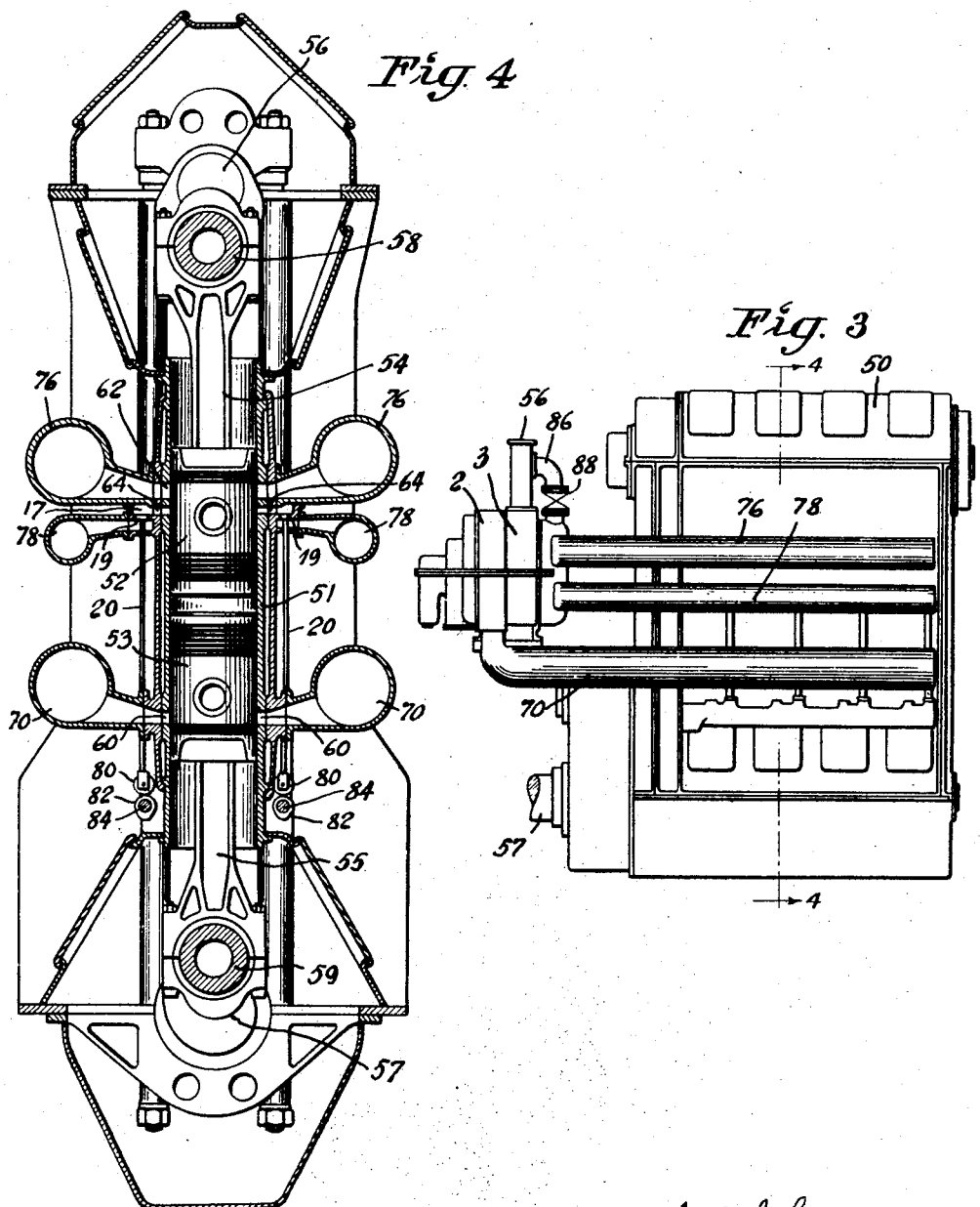

Patented Nov. 25, 1947

2,431,563

UNITED STATES PATENT OFFICE 2,431,563

TWO-CYCLE ENGINE WITH SUPERCHARGER DRIVEN BY PARALLEL HIGH- AND LOW-PRESSURE STAGED EXHAUST GAS TURBINE

Johan Erik Johansson, Goteborg, Sweden, assignor to Aktiebolaget Gotaverken, Goteborg, Sweden, a corporation of Sweden Application November 17, 1943, Serial No. 510,699
In Sweden November 9, 1942

Section 1, Public Law 690, August 8, 1946
Patent expires November 9, 1962

2 Claims. (Cl. 60—13)

1

The present invention relates to power plants including an internal combustion engine, a turbine driven by the exhaust gases of the engine, and a compressor driven by said turbine and adapted to produce scavenging air and, if desired, supercharging air.

The invention has for its primary object to utilize as completely as possible the energy contained in the exhaust gases and to obtain the most favourable working conditions for the turbine. In accordance therewith, the invention aims at the provision of a power plant including a turbo compressor, in which the exhaust gases of the engine can be utilized to such an extent that sufficient scavenging air at the required pressure and, in addition thereto, supercharging air can be obtained from the turbo compressor without taking away from the engine a substantial amount of energy for the operation of the turbine and without difficulties in the operation of the turbine at starting or idling and at low loads.

This and further objects of the invention are attained by mechanism shown in the annexed drawings, in which—

Fig. 1 shows an embodiment of the invention, some of the parts being shown in section; Fig. 2 illustrates an indicator diagram for the plant shown in Fig. 1; Fig. 3 is a side elevation of a power plant according to the invention having a multi-cylinder engine; and Fig. 4 is a section to an enlarged scale along the line 4—4, Fig. 3.

Referring to Fig. 1, reference numeral 1 denotes the cylinder of a two-stroke motor with uniflow scavenging, scavenging air and, if desired, supercharging air being supplied to said cylinder by a turbo compressor 2 driven by an exhaust gas turbine 3. The piston of the motor is indicated at 4. Scavenging air passes from the compressor through a conduit 5 and is admitted to the cylinder at the lower portion thereof through scavenging ports 6 provided in the cylinder wall and controlled by the motor piston 4. At its upper end, the cylinder has an outlet opening 7 controlled by an outlet valve 8 the stem 9 of which is, by means of links 10 and 11, actuated by a cam 12 mounted on a cam shaft 13. The exhaust gases blown out through the valve 8 are supplied through a conduit 23 into a low pressure stage of the exhaust gas turbine 3.

In addition to the outlet opening 7 controlled by the valve 8, the cylinder is provided with exhaust gas openings 16 disposed above the scavenging ports 6. Through said openings 16, exhaust gases will be discharged, the pressure of which is higher than the final pressure in the

2 cylinder. The openings 16 are by means of a channel 17 connected to a conduit 18 communicating with a high pressure stage in the turbine 3. The supply of gases to the conduit 18 is controlled by means of a valve 19 which through links 20 and 21 is actuated by a cam 22 mounted on the cam shaft 13.

The gas conduits 18 and 23 are connected with separate inlets of the turbine 3 and communicate with different pressure stages in the turbine. Advantageously, the blades for the high pressure fluid are rotating at a higher peripheral speed than the blades for the low pressure fluids. The blades 50 for the high pressure fluid may be provided on the same blade wheel 51 as, and radially outwardly of, the blades 52 for the low pressure fluid. Such an arrangement and construction of the blade rims is advantageous with regard to the different velocities of the fluids and in view of the fact that the pressure drop of the low pressure gases varies to a relatively great extent in response to the load on the engine.

In order to facilitate or render possible the start of the engine and to secure a favourable operation of the engine at low loads, means are provided for alternatively passing exhaust gases of low pressure to the atmosphere without supplying such gases to the turbine. In the embodiment shown in Fig. 1, the exhaust gas conduit 23 is connected with a conduit 55 communicating with the exhaust pipe 56 of the turbine 3. The flow of the gases is controlled by means of an adjustable valve 24 which may be operated manually or automatically. In the embodiment shown, the valve 24 is controlled by the pressure prevailing in the conduit 18. A conduit 25 connects the conduit 18 with a cylinder 26 in which the exhaust gases having a relatively high pressure actuate a piston 27. A spring 28 actuates the opposite side of the piston and counteracts the pressure exerted by the exhaust gases. By means of a piston rod 29 and links 30 and 31, the piston is positively connected to the adjustable valve 24. If the pressure prevailing in the conduit 18 is sufficiently high, the pressure acting through the conduit 25 on the piston 27 will maintain said piston in the position shown in Fig. 1, in which the adjustable valve 24 shuts off the connection with the conduit 55 and the atmosphere, while the exhaust gases from the engine are freely passing to the turbine 3. At the start and at low loads on the engine, the pressure prevailing in the conduit 18 will be decreased, and, as a consequence thereof, the spring 28 will force the piston 27 downwards, and the valve 24 will be moved into the position shown in dotted lines. In the said position, the admission to the turbine 3 from the conduit 23 is shut off, and the exhaust gases will flow through the conduit 55 into the atmosphere, for instance, via a silencer.

The mode of operation of the power plant shown in Fig. 1 is illustrated in the indicator diagram in Fig. 2, the upper portion of which is omitted. In said diagram, A relates to the engine, B to the high pressure portion of the turbine, C to the compressor, and D to the low pressure portion of the turbine. S indicates on the abscissa $x$ the length of the piston stroke, whereas the numerals 1 to 8 on the ordinate $y$ indicate absolute pressure in kilograms per square centimeter. During the downward movement of the piston, valve 19 is entirely opened before the piston uncovers the openings 16. When said openings are uncovered, exhaust gases at relatively high pressure will be admitted to the turbine. The valve 8 begins its opening movement before the piston begins to uncover the scavenging ports 6. The valve 19 for the high pressure exhaust gases is closed at the same time when the valve 8 begins to open, or immediately thereafter. If the load on the engine is sufficiently high, exhaust gases at a relatively high pressure, for instance, at a pressure of about 2.75 kilograms per square centimeter absolute, will be discharged from the engine, while the low pressure gases will be withdrawn at an absolute pressure of about 1.6 kilograms per square centimeter, as illustrated in Fig. 2. In order to obtain a favourable utilization of the energy contained in the exhaust gases, it is advisable to keep the ratio between the pressures of the high pressure gases and the low pressure gases at about from 1.4 to 2.1, for instance at 1.75, as in the example given. The scavenging and supercharging air is compressed to an absolute pressure of about 2 kilograms per square centimeter. Due to the fact that the low pressure gases at low loads, that is, when supercharging is not required, are discharged to the atmosphere, a relatively low combustion pressure is obtained in the cylinder, and the engine will not be subject to unnecessary high stresses. If such connection between the low pressure gases and the atmosphere were not provided at low loads or when the engine is idling, a back pressure would be established and effect a braking action on the turbine. The arrangement according to the invention thus provides for the best possible utilization of the energy of the exhaust gases and results in particularly advantageous working conditions for the turbine.

The provision of the openings 16 and the channel 17 communicating therewith, as shown in Fig. 1, is to be regarded as a suitable example only.

In order under all conditions to ensure that the compressor aggregate can be started simultaneously with the engine, or in order to render possible starting of the compressor aggregate prior to the engine, the turbine 3 may be provided with an additional set of nozzles, through which air, gases or steam may be supplied from a starting air tank, steam generator or similar source of pressure by means of a conduit 32, as shown in Fig. 1. In this way, the compressor, at the start of the engine, can obtain a speed sufficiently high to effect scavenging of the engine cylinder immediately at the start.

In an opposed piston engine cylinder with uniflow scavenging and two pistons running in opposite directions, piston controlled exhaust ports for low pressure gases may be provided at the one end of the cylinder, whereas scavenging ports for the supply of scavenging air and a valve for high pressure gases located above the last named ports may be provided at the other end of the cylinder, or the outlet for the high pressure gases may be disposed at the same end of the cylinder as the openings for the low pressure gases.

An embodiment of the last named type is illustrated in Figs. 3 and 4. Each of the cylinders 51 of the engine is provided with pistons 52 and 53 working in opposite directions and connected, by means of piston rods 54 and 55, respectively, with the crank arms 58 and 59, respectively, of the crank shafts 56 and 57, respectively.

In each cylinder, there are provided inlet ports 60 for scavenging air and, if desired, supercharging air. At the opposite end of the cylinder 51, outlet ports 62 are arranged for exhaust gases to be discharged at the final pressure in the cylinder. By means of exhaust ports 64, gases are discharged at a pressure higher than the final pressure in the cylinder. The ports 60 and 62, 64 are controlled by the pistons 53 and 52, respectively, in a manner such that the ports 64 will be uncovered prior to the ports 60 and 62. The scavenging air ports 60 are in communication with conduits 70 arranged along the engine on either side thereof, said conduits being common to all engine cylinders and connected to a compressor 2 driven by an exhaust gas turbine 3. The exhaust ports 62 for the low pressure gases communicate with conduits 76 arranged on both sides of the engine, said conduits being common to all cylinders and connected with a low pressure stage of the turbine which may be constructed in a similar manner as the turbine shown in Fig. 1. The exhaust ports 64 for the high pressure gases are by means of a channel 17 and valves 19 connected with conduits 78 also disposed on either side of the engine. The conduits 78, too, are common to all of the cylinders of the engine and are connected with the high pressure stage of the turbine 3.

The valves 19 are timed in relation to the uncovering of the ports 64 in a similar manner as described in connection with Fig. 1. The said valves are connected with rods 20, which at their lower ends are provided with rollers 80 abutting against cams 82 on cam shafts 84 which are suitably driven by the crank shaft 57, for instance by means of a toothed gearing or a chain transmission not shown in the drawing.

Numeral 86 indicates a conduit provided with a shut-off valve 88 for connecting the turbine admission chamber for the low pressure gases with the turbine exhaust conduit 56. Upon opening of the valve 88, the conduit for the low pressure gases will be put in direct communication with the atmosphere.

The conduits 78 will under operation serve as a receiver for the turbine 3.

What I claim is:

1. In a power plant, an internal combustion two-stroke engine having at least one cylinder and at least one piston movable in said cylinder, an exhaust gas turbine having a low pressure stage and a high pressure stage, an air compressor, a power transmission between said turbine and said compressor, a first conduit connected to said cylinder for admitting merely exhaust products from said cylinder to the low pressure stage of said turbine, means for tapping off combustion gases from said cylinder during part of each expansion stroke at a pressure higher than the pressure of said exhaust products, a second conduit separately connected to said cylinder for admitting said combustion gases from said cylinder to the high pressure stage of said turbine, a third conduit for admitting air from said air compressor to said cylinder, means for putting said first conduit into communication with the atmosphere, a member associated with each cylinder of the engine for controlling the supply of said combustion gases directed from the cylinder to said second conduit, and means responsive to the position of said piston for actuating said member, the parts being constructed and arranged so that when said first conduit is in full communication with the atmosphere, said turbine will be supplied with high pressure gas sufficient to cause said compressor to provide said cylinder with the required quantity of air.

2. In a power plant, an internal combustion two-stroke engine having at least one cylinder and at least one piston movable in said cylinder, an exhaust gas turbine having a low pressure stage and a high pressure stage, an air compressor, a power transmission between said turbine and said compressor, a first conduit for admitting merely exhaust products from said cylinder to the low pressure stage of said turbine, a second conduit for admitting high pressure exhaust gases from said engine to the high pressure stage of said turbine, a third conduit for admitting air from said air compressor to said cylinder, a member associated with each cylinder of the engine for controlling the supply of high pressure exhaust gases directly from said cylinder to said second conduit, means responsive to the position of said piston for actuating said member, a valve device for putting said first conduit into communication with the atmosphere, and means responsive to a decrease of the gas pressure in said second conduit for opening said valve device.

JOHAN ERIK JOHANSSON.

REFERENCES CITED

The following references are of record in the file of this patent:

UNITED STATES PATENTS

| Number | Name | Date |
| --- | --- | --- |
| 1,634,797 | Newton | July 5, 1927 |
| 1,849,170 | Büchi | Mar. 15, 1932 |
| 1,856,024 | Büchi | Apr. 26, 1932 |
| 2,005,821 | Büchi | June 25, 1935 |
| 2,051,436 | Curtis | Aug. 18, 1936 |
| 2,123,009 | Johansson | July 5, 1938 |
| 2,136,013 | Lentz | Nov. 8, 1938 |
| 2,152,972 | Pateras-Pescara | Apr. 4, 1939 |
| 2,176,021 | Grutzner | Oct. 10, 1939 |

FOREIGN PATENTS

| Number | Country | Date |
| --- | --- | --- |
| 324,836 | Great Britain | Feb. 6, 1930 |
| 354,242 | Great Britain | July 30, 1931 |
| 586,522 | France | Jan. 6, 1925 |